United States Patent [19]

Russo et al.

[11] Patent Number: 5,621,860
[45] Date of Patent: Apr. 15, 1997

[54] MEMORY ORGANIZATION METHOD FOR A FUZZY LOGIC CONTROLLER AND CORRESPONDING DEVICE

[75] Inventors: Biagio Russo, Mascalucia; Claudio Luzzi, Acri; Rinaldo Poluzzi, Milan, all of Italy

[73] Assignees: SGS-Thomson Microelectronics S.r.l., Agrate Brianza; Consorzio per la Ricerca sulla Microelettronica nel Mezzogiorno, Catania, both of Italy

[21] Appl. No.: 257,775

[22] Filed: Jun. 9, 1994

[30] Foreign Application Priority Data

Jun. 9, 1993 [EP] European Pat. Off. ............. 93830252

[51] Int. Cl.⁶ .................................................. G06G 7/00
[52] U.S. Cl. ................................. 395/3; 395/61; 395/900
[58] Field of Search ........................ 395/3, 900, 10–11, 395/50–51, 60–61

[56] References Cited

U.S. PATENT DOCUMENTS 5,287,432  2/1994  Tomitaka ................................. 395/61

OTHER PUBLICATIONS

Patent Abstracts Of Japan, vol. 016, No. 337 (P–1390), Jul. 22, 1992 & JP–A–04100153 (Yaskawa Electric Corp.), Apr. 2, 1992.

Taylor, Valerie E., Abhiram Ranade, and David G. Messerchmitt. SPAR: A New Architecture for Large Finite Element Computations. IEEE Trans. on Computers. vol. 44, No. 4. pp. 531–545. Apr. 1995.

Primary Examiner—Tariq R. Hafiz
Attorney, Agent, or Firm—David M. Driscoll; James H. Morris

[57] ABSTRACT

A method for loading the memory of an electronic controller operating using fuzzy logic, whereby predetermined membership functions of logic variables, defined within a universe of discourse sampled in a finite number of points, are subjected to inference operations basically configured as IF/THEN rules with at least one front preposition and at least one rear implication. The controller includes a central control unit provided with a memory section for storing predetermined values of the membership functions which appear in the front or IF part of the fuzzy rules and have a predetermined degree of truth or membership. This method provides for storing the memory section the only values of those membership functions that have a value of the degree of membership other than zero at the points of the universe of discourse.

21 Claims, 6 Drawing Sheets

MEMORY ORGANIZATION METHOD FOR A FUZZY LOGIC CONTROLLER AND CORRESPONDING DEVICE

BACKGROUND OF THE INVENTION

1. Field of the Invention

This invention relates to a method for loading a memory of an electronic controller operating using fuzzy logic, and to an electronic controller operating in accordance with the method. More particularly, the invention relates to a method of loading a memory of an electronic controller operating using fuzzy logic, whereby predetermined membership functions f(m) of logic variables M—defined within a so-called universe of discourse U sampled at a finite number of points m—are subjected to inference operations basically configured by IF/THEN rules with at least one front preposition and at least one rear implication. The controller also includes a central control unit provided with a memory section for storing predetermined values l of the membership functions f(m), which appear in the front or IF part of the fuzzy rules and have a predetermined degree G of truth or membership.

The field of application of this invention is related to developments of artificial intelligence in connection with electronic data processing instruments based on a type of logic known as fuzzy logic.

2. Discussion of the Related Art

Fuzzy logic is winning acceptance as a technique which can provide solutions to a wide class of control problems, in relation to which such traditional techniques as those based on Boolean logic have failed to yield acceptable performance levels at a reasonable cost.

A clearer understanding of the invention calls for a brief discussion of the two principal methods of representing and modeling reality, i.e. of the types of mathematic models which can be used to define the terms of a given problem to solve. We refer in particular to those methods which are Commonly used to solve problems with the aid of electronic computing instruments.

The first method provides a numerical/analytical description of reality, and is widely employed in engineering and scientific branches for all those applications where all the terms of a problem to be solved can be effectively identified. This method has had considerable influence on the architectures of current data processing instruments, but hardly suits those situations where the aspects of the problem tend to be "fuzzy" or difficult to identify, as may be the case with artificial intelligence applications.

In such situations, a modeling technique yielding a quantitative and qualitative description of the problem to be solved has proved to be the most effective, and it is there that the fuzzy logic can provide a body of rules for dealing with problems which involve uncertainty and imprecision as is typical of most human activities. In other words, fuzzy logic provides a method of modeling the "indefinite" reasoning that is typical of human mind, a reasoning which plays, however, an essential role in human ability to make decisions under conditions of uncertainty.

Fuzzy logic operates on a linguistic description of reality using a particular class of variables called language variables. The value of such variables may consist, for example, of words or phrases of any natural or artificial language. Basically, each variable is assigned a corresponding semantic meaning of the words or phrases which are used at the modeling stage of a given problem. In addition, a set of values may be associated syntactically to each variable, which are dependent on it and can take different meanings according to the context in which they are used. Such values are obtained from a primary term which represents the variable, an antonym thereof, and a series of so-called modifiers of the primary term. By way of example, assume that the name or notion "temperature" is taken to define the language variable M, and that the word "cold" is selected as a primary term for the variable M and the word "warm" as its antonym. To the primary term there may also be appended a series of so-called modifiers such as "not", "very", "more", "less", etc. (whence: not cold, very cold, colder, etc.) to complete the set of values of the variable, in an uncertain or non-univocal manner, but adequate for the peculiarities of fuzzy logic.

Each value assigned to a language variable is further represented by a so-called fuzzy set, namely a stochastic distribution function which ties each value of the variable within its corresponding domain of definition, also referred to as a universe of discourse, to a point in the range [0, 1] indicating the degree of truth or membership of the value considered. The functions which identify a fuzzy set in the universe of discourse are called membership functions f(m). For instance, a value of f(m)=0 would indicate that the point m is not a member of the fuzzy set identified by the function f, whereas a value of f(m)=1 would indicate that m is definitely a member of the fuzzy set. The aggregate of all the fuzzy sets of a language variable is called term set.

Membership functions admit two different types of representations: an analytical representation and a vectorial representation. The former is tied to the universe of discourse and allows said domain to be mapped within a 0 to 1 range of values. The second type consists, on the other hand, of a vectorial sample representation of the membership function as obtained by splitting the universe of discourse into m points and the range [0, 1] into 1 levels.

Appropriate logic operations, called inference operations, may be carried out among the membership functions which enable to describe the performance of a system as the input parameters vary. These operations are carried out using fuzzy rules which, in general, obey to a syntax of the following type:

IF X IS A, THEN Y IS B where, X is the input value, A and B are membership functions f(m) which represent the system perception, and Y is the output value.

The part of the rules before the term THEN is called the "IF part" or front part, and that after the term THEN is called the "THEN part" or rear part of the inference rule.

Among the inference rules which can be applied to the membership functions of the language variables, a so-called weight function P can be defined which provides an indication of how well the input preposition X of the IF part of a rule matches the membership function A. That is, the degree of membership of X to A can be said to be the weight of the IF part of the rule, and that weight will affect the assignment of B to Y, which forms the THEN part of the rule. The various rules affecting all the fuzzy sets which characterize a language variable to be controlled will, therefore, be activated each with a weight of its own, and will proportionally affect the THEN parts, and therefore the output value from the electronic controller operating in fuzzy logic.

Electronic instruments for data processing which perform such operations must incorporate a specific architecture, specially dedicated for the set of inference operations which constitute the fuzzy logic computational model. By virtue of these computing devices operating according to a method of representing and modeling reality which is based on fuzzy logic, it has become possible to process purely abstract concepts analytically in a manner that closely resembles human reasoning, such as the term "room temperature", for example.

However, an essential prerequisite to a satisfactory result is that the membership functions of the fuzzy set be sufficiently and correctly defined within the control device. In fact, the better that definition reflects the semantics of the fuzzy concept, the more correct the rate of occurrence of a term in a rule will be, whereby the output value from the electronic controller operating using fuzzy logic can track reality more closely.

The definition or setting up of membership functions which identify the fuzzy sets within a fuzzy logic-based electronic controller has represented, heretofore, a major factor which hindered both the development of new fuzzy logic applications and the verification of the theoretical potential of the method.

In fact, when membership functions should reflect, upon their hardware implementation, the semantics of the fuzzy concept, in order to obtain the proper rate of occurrence of a term in a rule, considerable storage space must be implemented, which only makes the fuzzy logic advantageous for those applications where the term set of the language variable includes a relatively small number of membership functions.

A first remedy to this drawback is that of storing just some outstanding points of a membership function, specifically those where the function changes its gradient, thereby accomplishing a drastic reduction in the memory size. However, since the fuzzy device has to effect the joining of such points in order to proceed to the fuzzy computation proper, the computation of intermediate points is bound to draw substantially on the computation capacity. Furthermore, devices based on this method have a low level of flexibility because they operate on a limited number of predetermined membership function forms. Examples of such a device are a machine called the FP-3000, available from Omron Corporation or a machine called the NLX-230, available from Neural Logix Corporation. These devices operate using digital technology presenting the membership function in analytical form. The digital technology additionally allows the membership functions to be represented in vectorial form, to split the universe of discourse into a finite number of points and store the respective degrees of membership of membership functions at those points.

Outstanding advantages of this technology are a good definition of the membership functions within the control device and the extreme computational simplicity it affords in the performance of the computation operations, that is the inferences of a fuzzy logic type.

However, this high computation rate occupies a substantial amount of memory space due to the fact that each membership function requires that its values at all points of the universe of discourse have to be stored. Digital methods operating on a vectorial representation of the membership functions are known as Warp or Fulcrum methods.

SUMMARY OF THE INVENTION

The drawback of the prior art can be resolved by limiting the storage of the membership functions in correspondence to those points in the universe of discourse where the value of the degree of membership of the function is other than zero (not null).

The present invention includes a method for loading a memory of an electronic controller operating using fuzzy logic whereby predetermined membership functions of logic variables, defined within a universe of discourse sampled in a finite number of points, are subjected to inference operations basically configured as IF/THEN rules with at least one front preposition and at least one rear implication. The controller includes a central control unit provided with a memory section for storing predetermined values of the membership functions appearing in the front or IF part of the fuzzy rules and having a predetermined degree of truth or membership, wherein the only values of those membership functions which have a value of the degree of membership other than zero at the points of the universe of discourse are stored in the memory section. The present invention also includes a controller wherein the capacitor of the memory section is sized according to the number of non-zero values of the membership functions as the point of the universe discourse with the largest number of non-zero values. The features and advantages of the controller according to the invention will become apparent, moreover, from the following description of an embodiment thereof given by way of illustration and not of limitation with reference to the accompanying drawings.

DETAILED DESCRIPTION

Figure 1:
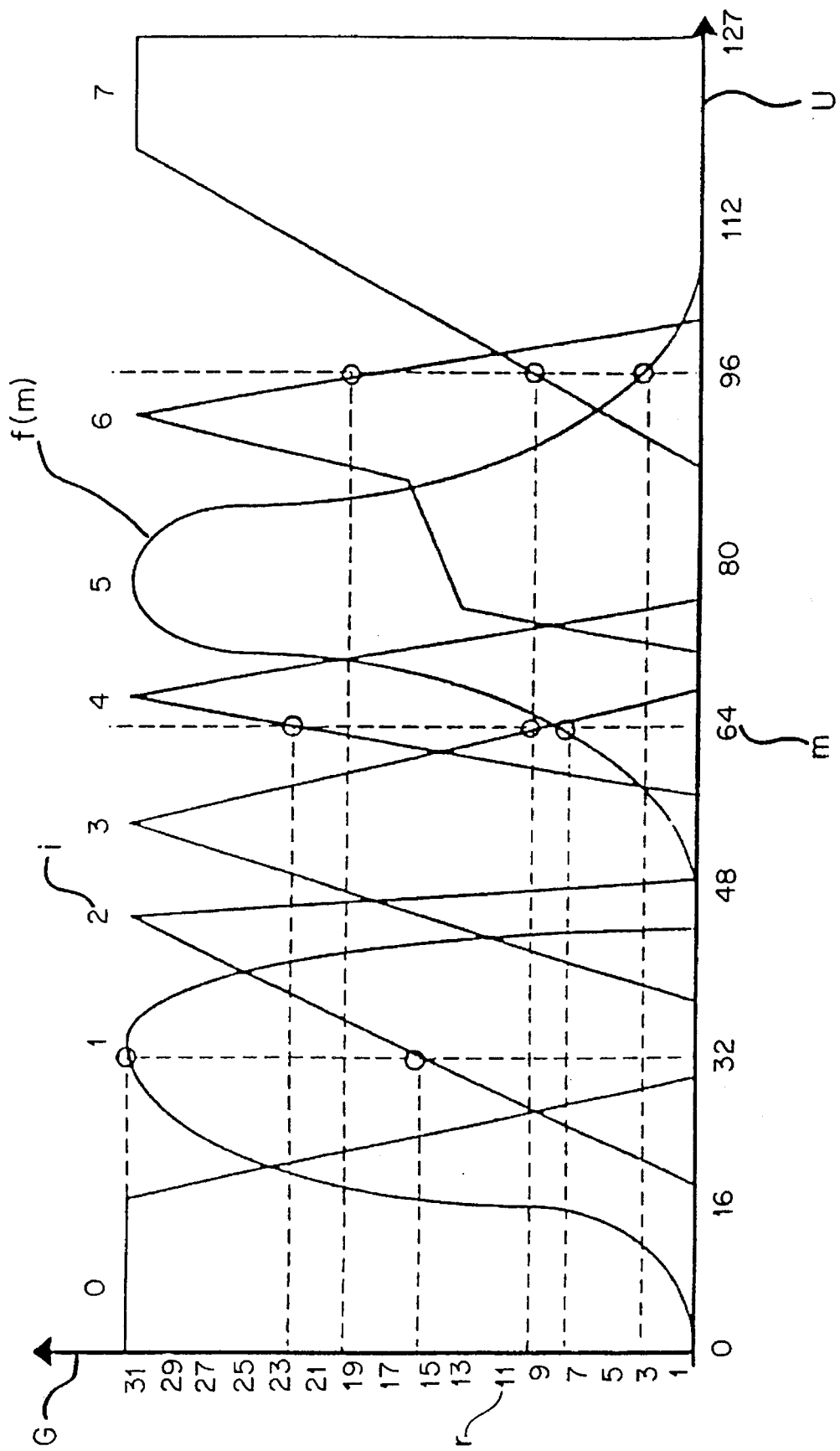
FIG. 1 shows diagrammatically a term set with a sampled universe of discourse and wherein the membership functions are represented in vectorial form.

With reference to FIG. 1, the term set of a language or logic variable M is represented by a vectorial system wherein the so-called universe U of discourse is plotted along the abscissa axis, and the degree G of truth or membership along the ordinate axis.

In such a case, the universe U of discourse and the degree of membership G are respectively sampled in one hundred and twenty eight points m and thirty two levels or values l. The term set is made up of eight membership functions $f(m)_i$ which identify, within the universe U of discourse, an equal number of fuzzy sets (i being the index of each membership function).

In FIG. 1, the membership functions f(m) have been numbered using indices i from zero to seven in increasing order from left to right. Taking, for instance, the point m=32 in the universe U of discourse, we get for the membership functions $f(32)_{0,3-7}$ a value l of the degree G of truth of zero, whilst for the membership function $f(32)_1$ we get a value of thirty one and for the function $f(32)_2$ a value of fifteen.

Coming back to the previously described example where the concept "temperature" is defined as the logic variable M, we can state that the term set shown in FIG. 1 is a visualization of the "temperature" variable in vectorial form.

A language variable of this type is ideally suited to mathematic modeling based on fuzzy logic.

An electronic control device designed for operation using fuzzy logic allows language variables of the type represented by the term set in FIG. 1 to be modeled accordingly.

Figure 2:
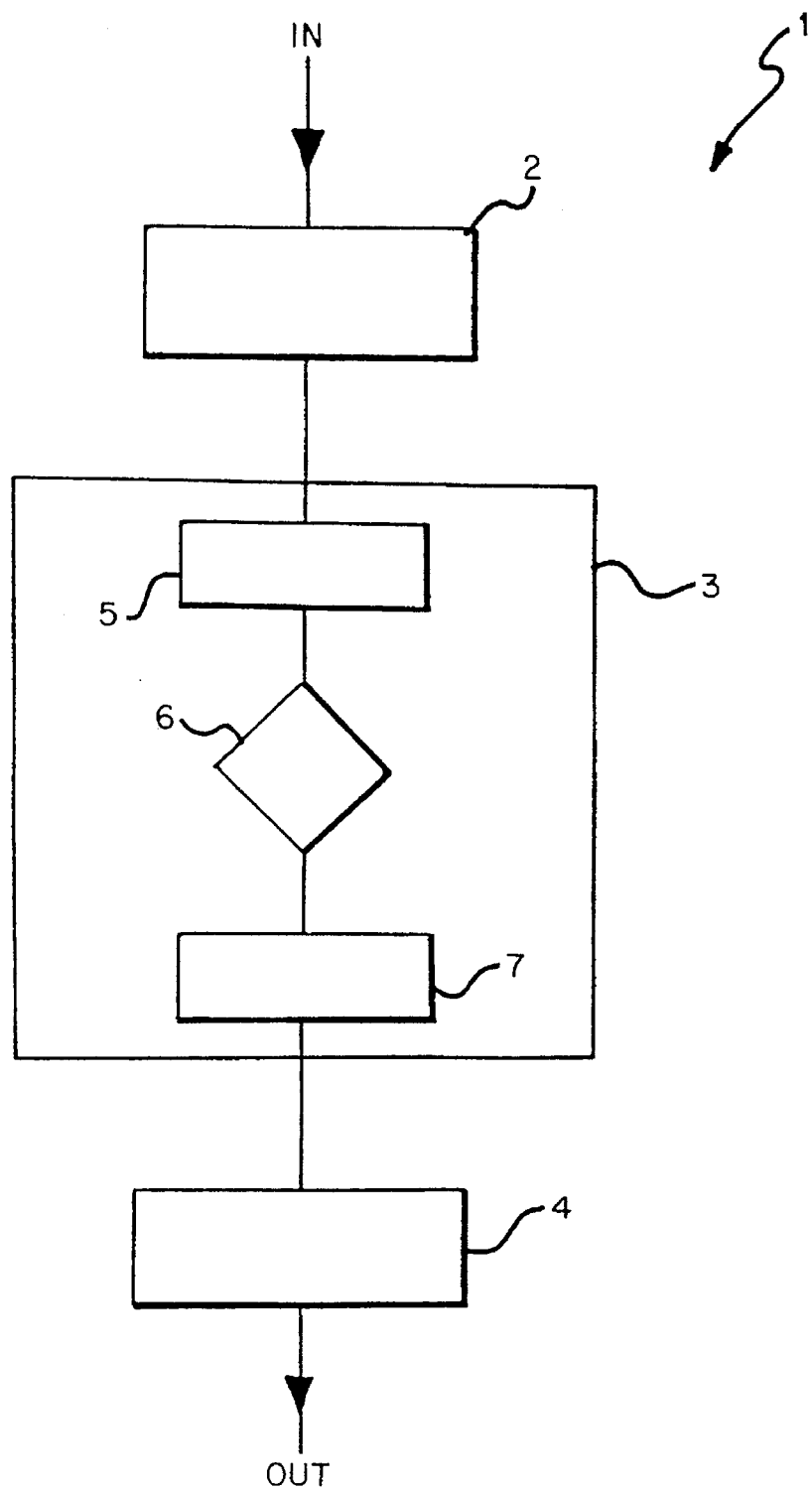
FIG. 2 shows a control device operating using fuzzy logic, according to the prior art.

With reference to FIG. 2, at 1 is generally and schematically shown an electronic control device according to the prior art. The controller 1 is basically an apparatus receiving an input signal IN corresponding to control physical variables, such as analog or digital signals from sensors, and performs predetermined fuzzy logic inference operations to output selected control signals OUT.

To this aim, the controller 1 has an input, or a plurality of inputs, IN and an output, or plurality of outputs, OUT. In the embodiment shown in FIG. 2, a single input and a single output have been preferred. Each input IN is led to a corresponding conversion device (fuzzyfier) 2 operative to convert an input signal to logical information of the fuzzy type, that is to a so-called membership function f(m).

The controller 1 further includes a central control unit 3 wherein fuzzy logic membership functions f(m) are stored and fuzzy logic computation is also performed.

In particular, said central unit 3 has a memory section 5 (IF memory) for storing only those values related to the membership functions f(m) which appear in the left-hand portion of fuzzy rules, and a memory section 7 (THEN memory) which only contains data related to the membership functions which appear in the right-hand portion of the fuzzy rules.

The memories may be of the PROM, or EPROM, or even of the RAM type. Provided between the two memory sections 5 and 7 is a calculating section 6 for carrying out the fuzzy logic inference operations.

The architecture of the controller 1 is completed by a conversion device 4 (defuzzyfier) effective to provide an appropriate interface between the controller 1 and the outside world.

The loading procedure into the memory section 5 of the prior-art controller 1, specifically in accordance with the aforesaid Warp method, will now be described with reference to FIG. 3.

Figure 3:
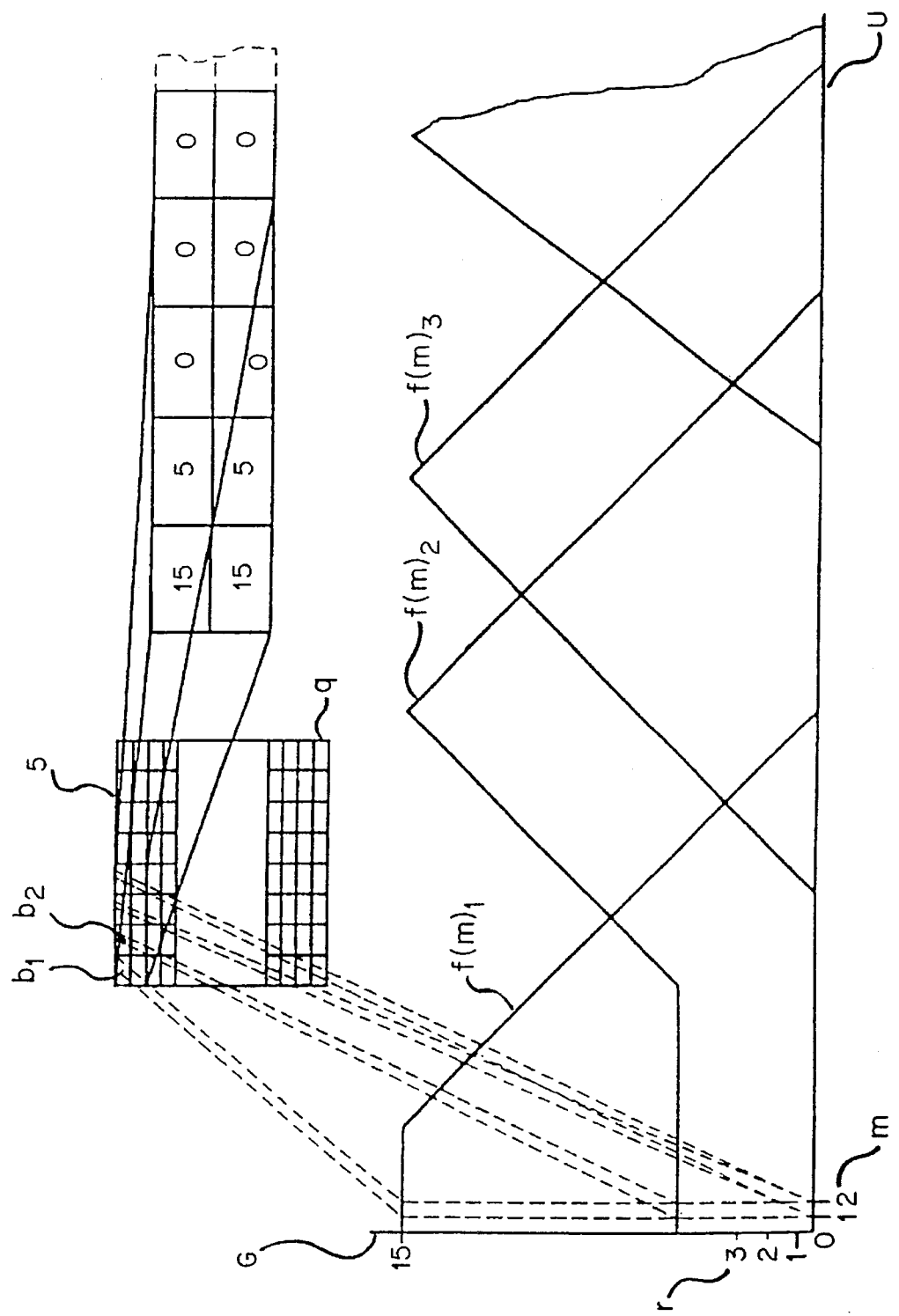
FIG. 3 illustrates diagrammatically the setting up of data in a term set, of the kind shown in FIG. 1, within the memory of a fuzzy controller as shown in FIG. 2.

In FIG. 3 there is shown diagrammatically, besides the IF memory 5, a term set similar to that shown in FIG. 1, which comprises eight membership functions $f(m)_i$ and a degree G of truth sampled in sixteen levels.

The memory 5 is loaded with all the information required for fuzzy logic computation which follows in the calculating section 6. Each line q of the memory 5 represents a well-defined point m in the universe U of discourse. The depth of the memory 5 depends on the sampling of the universe U of discourse; accordingly, when the universe U of discourse is sampled in one hundred and twenty eight points m (like in the example of FIG. 1), the memory depth will be one hundred and twenty eight lines.

The information is stored (in binary code) by sequentially writing, into each line q of the memory 5, the value l of the degree G of truth of the eight membership functions f(m) at each given point m of the universe U of discourse. Thus, at the point m=1, we get the values 15/5/0/0/0/0/0/0, at the point m=2 the values 15/5/0/0/0/0/0/0, and so on. Each of these binary-coded lines constitutes a memory word.

The size of a memory word is determined by its length, namely the number of bits required to contain all the word information. In this specific case, with the degree of truth sampled in sixteen levels, four memory bits are needed for each membership function, for a total of thirty two bits.

In FIG. 3, the first four bits $b_1$ of the memory word represent the degree G of truth of the membership function $f(m)_1$, the next four bits $b_2$ the degree of truth of the membership function $f(m)_2$, etc.

The size of the IF memory 5 is determined by its depth and by the length of the memory word. In the example of FIG. 3, this size will be 128*32 bits, while in the example of FIG. 1 (where a degree of truth sampled in thirty two levels corresponds to five bits), it will be 128*40 bits.

The prior-art storing method just described allows the electronic control device to operate at high computational rates and a good degree of resolution. However, a major drawback of that method resides, as we have seen, in the high memory space required for its implementation.

On the other hand, according to this invention, a novel method for setting up the memory of the electronic control device, to be described, enables the size of the memory to be drastically cut down for the same computational rate and degree of resolution.

This result is obtained, contrary to the teachings of the prior art, by storing into each line q of the IF memory section 5 only the values l of those membership functions f(m) which have, at the points m of the universe U of discourse, a non-null (other-than-zero) value l of the degree of membership G.

In particular, the number of values l of the membership functions f(m) stored in said memory section 5 is determined according to the number of non-null values l of the membership functions f(m) at a predetermined point m of the universe U of discourse including the largest number of non-zero values.

Coming back to the term set of the example in FIG. 1, the largest number of non-null values l is three and locates, for example, at the points m=64 and m=96. For this term set, the amount of values l of the membership functions f(m) that will be stored into each line of the memory is at most three, instead of eight of the prior art method.

Advantageously, the length of the memory word, i.e. its dimension, is arranged to be dependent on said maximum number of non-null values. In a first preferred embodiment, the length of a word of the IF memory section 5 is defined as follows:

Word Length=(nf(m)*(dim(G))+dim(f(m)), where nf(m) is the number of non-null values at the point of the universe U of discourse where this number is at a maximum;

dim(G) is the size of the word required to represent the aggregate of the values l of the degree G of truth; and dim(f (m)) is the size of the word required to represent the aggregate of the indices i of the membership functions f(m).

In the example of FIG. 1, the coefficient nf(m) is, as previously mentioned, three, the coefficient dim(G) is equal to five bits (G is sampled in thirty two levels), and the coefficient dim(f(m)) is equal to three bits (there are eight membership functions f(m)).

Substituting these values in the above cited definition, a word length of (3*5)+3=18 bits is obtained, instead of forty bits of the prior art. The memory size will, therefore, be of 128*18 bits.

Thus, for a given sampling of the universe U of discourse, the size of the IF memory section 5, as optimized by the method just described, is much more compact than a memory size obtained by the prior art method.

The information which is written sequentially into each line of the memory section 5 comprises the membership function $f(m)_{i^\circ}$ which has, among the membership functions with non-null value, the lowest index i (i°), together with the values l of the degree of membership G of the membership functions $f(m)_i$ with non-null value, which in this specific example are at most three. For instance, at the point m=64 of the universe U of discourse, the word of the IF memory would contain the following binary coded information: $f(64)_3/$ 9, 23, 7.

Compared with the prior art method of the previous example, all data concerning the membership functions with l=0 are advantageously removed from each memory line, and between the membership functions $f(m)_i$ having a non-null value l, only the membership function with the lowest index i is stored.

It can be appreciated that by this method of loading the memory, part of the information about the term set—such as the part concerning data about the membership functions with values l equal to zero—would not be coded and thus would be lost. In order to effect an appropriate extraction of the weights involved in the computation operations using fuzzy rules, an effective-value restoring step of all the membership functions of the Term set is advantageously provided. In other words, the information issued from the IF memory section 5 is regenerated during the restoring step before moving to the calculation step.

This restoring step comprises a comparison of the bits of a reference word coming from a program memory wherein all the required fuzzy rules for the inference operations are stored, called $w(f_{rif})$ for simplicity, with the bits of a word containing the information about a membership function $f(m)_i$ having non-null value, called $w(f(m)_i)$ for simplicity. As noted above, $w(f(m)_i)$ may be an index i of each membership function $f(m)_i$. A controller cycles through suitable $w(f_{rif})$, which may be each possible value of i.

For a clearer explanation of the mechanism that underlies the restoring step, attention is directed to the example just discussed, wherein the word of the IF memory 5 at the point m=64 of the universe U of discourse was defined.

At this point, there are three membership functions with non-null values, and the function $f(64)_3$ has the lowest i index (i°=3). The other two membership functions with non-null value have the index i equal to four and five, respectively. As can be seen, the membership functions with a non-zero value at the point m=64 are adjacent to one another. The same phenomenon also occurs at the other points m of the universe U of discourse (see, for example, points m=32 or m=96). Characteristically, in most of the Term sets employed in fuzzy logic, the membership functions with non-null value are adjacent to one another.

This feature, which allows the making up of the non-storing of all the membership functions $f(m)_i$ with non null values l into the IF memory section 5, has been kept in mind when defining the control rules of the comparison procedure in the restoring step, and to obtain the bits of the words $w(f(m)_i)$.

In fact, based on the principle of adjacency of the membership functions having non-null value l, a comparison can be carried out not only between the bits of the word selected by the micro-encoder $w(f_{rif})$ and the bits of the stored word part coming from the IF memory 5 ($w(f(m)_{i^\circ})$, where i° is the lowest of the indices i of the membership functions with other-than-zero value, but also between the bits of $w(f_{rif})$ and the bits of the words which represent the unstored membership functions. The latter are adjacent to the membership function $f(m)_{i^\circ}$, i.e. they are the functions with the index i equal to i°+1, i°+2, etc. up to i°+(nf(m)−1), where nf(m) is the number of non-null values l at the point of the universe of discourse where this number is at a maximum.

In the example considered, with nf(m) equal to three, the above comparison may be described as follows: if the bit of $w(f_{rif})$ corresponds to the bit of $w(f(64)_3)$, then the weight that will be entered to the calculation step should correspond to the value l=9 associated with said membership function; if the bit of $w(f_{rif})$ corresponds to the bit of $w(f(m)_{3+1})$, then the weight to be entered should correspond to the value l=23 associated with said membership function, and so on.

On the contrary, if the bit of $w(f_{rif})$ does not correspond to any of the bits of $w(f(64)_{3,3+1,3+2})$, then the weight outgoing from the restoring step should have a value of zero.

Generalizing, it can be concluded that when the bits of $w(f_{rif})$ correspond to the bits of one of the words $w(f(m)_{i^\circ}, \ldots, i^\circ+(nf(m)-1))$, the selected weight outgoing from the restoring step will be the value l which corresponds to the i-th membership function $f(m)_i$ with $w(f_{rif})$ equal to $w(f(m)_i)$. Otherwise, the extracted weight will be zero.

Stated in logic/mathematic language, this rule controlling the restoring step may be written as follows:

if $w(f_{rif})=w(f(m)_{i^\circ}, \ldots, i^\circ+(nf(m)-l))$ ==>weight=value $l_{f(m)i^\circ, \ldots, i^\circ+(nf(m)-l)}$ if $w(f_{rif}) \neq w(f(m)_{i^\circ}, \ldots, i^\circ+(nf(m)-l))$ ==>weight=0, where weight means the value selected during the restoring step, and $l_{f(m)i^\circ, \ldots, i^\circ+(nf(m)l)}$ is the value l of the degree of truth G of the i°, . . . , i°+(nf(m)−l)-th membership function f(m) with non-null value.

Thus, by means of this restoring procedure, all the required information for an appropriate fuzzy logic computation can be regenerated without affecting the calculation rate of the electronic controller and the modeling degree of resolution.

Figure 4:
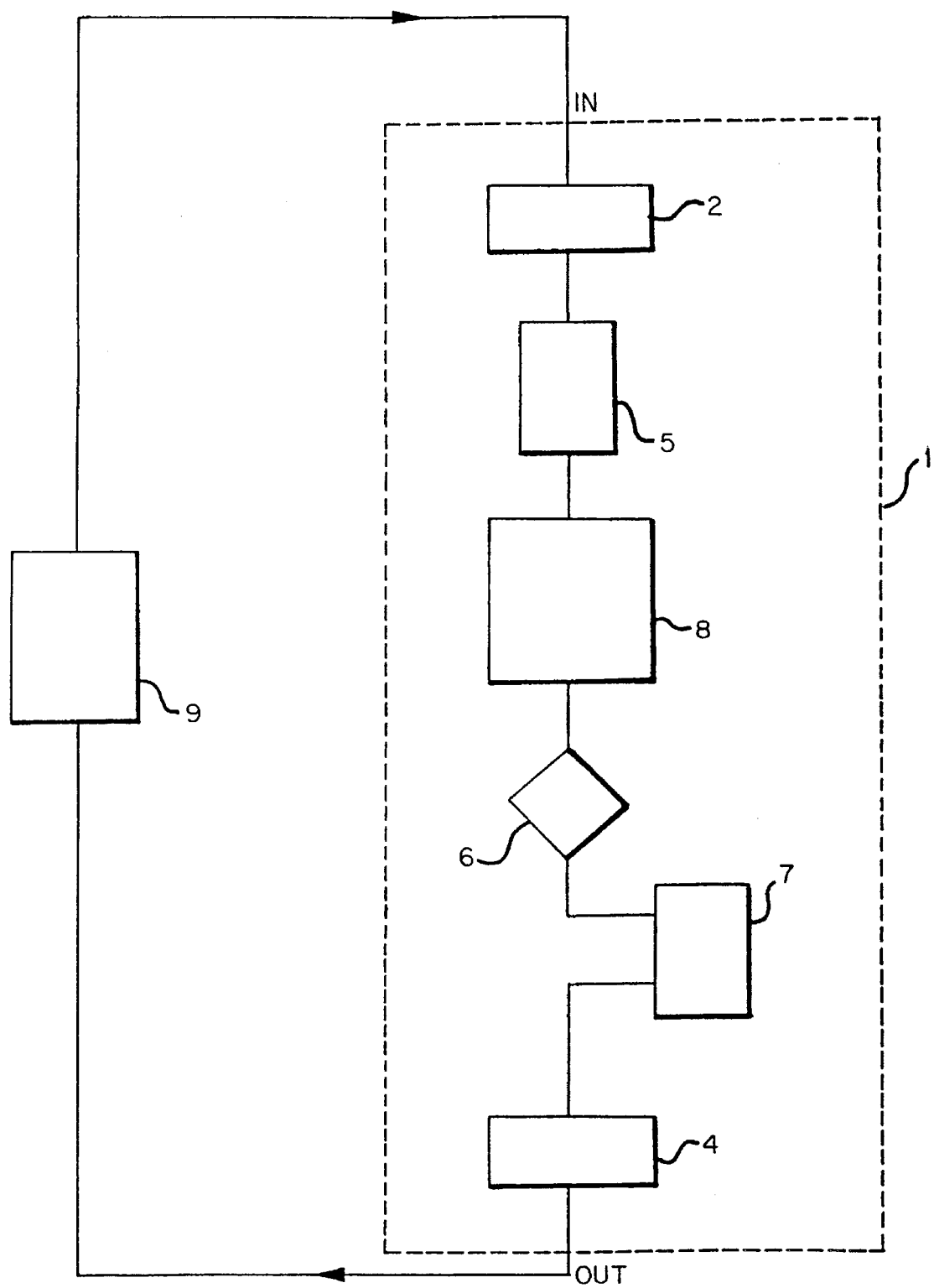
FIG. 4 is a general diagrammatic view of a feedback circuit incorporating a fuzzy controller according to the invention.

An example electronic control device operating in accordance with the present invention is shown in FIG. 4. Similar reference symbols denote parts of the device in common with the prior-art device in FIG. 2, and their description is not repeated.

In the loop circuit shown in FIG. 4, diagrammatically indicated at 9 is a system to be controlled. The system sends signals concerning the physical control variables, to the input IN of the electronic controller generally and schematically indicated at 1. Once the signals reach the controller 1, they are converted to fuzzy logic information by the fuzzyfier 2, and passed to the IF memory section 5, where the specific storing of only a part of the information is carried out.

The information stored into the IF memory 5A pass through a buffer section 8, to be described, where the restoring of fuzzy logic information, which are used, in the calculating section 6, for the appropriate inference operations, is carried out.

Finally, the values obtained at 6 are stored in the THEN memory section 7, reconverted to analog or digital signals by the defuzzyfier 4, and conveyed back to the system 9 from the output OUT of the electronic controller 1.

The IF memory section 5A is sized according to the number of non-zero values of the membership functions f(m) at a predetermined point m of the universe U of discourse having the largest number of non-null values.

It has been found that in nearly all of the fuzzy applications of fuzzy logic, the largest number of non-null values varies between one and five, and is three in most cases. Thus, according to this first embodiment of the inventive method, the optimum size of the memory 5A will preferably have a word length of eighteen bits.

The fact that, using a word length of eighteen bits, no more than a certain number of non-null values at the various points m of the universe U of discourse can be stored, is to be regarded as a merely apparent (and hence negligible) drawback of the device, since an electronic controller according to the invention can provide a good degree of resolution even when operating with a word length of the IF memory limited to just eighteen bits.

As previously mentioned, the electronic controller 1 of this invention advantageously includes a buffer section 8 interfacing the IF memory section 5A and the calculating section 6, to regenerate all the information required for proper computation using fuzzy logic.

Figure 5:
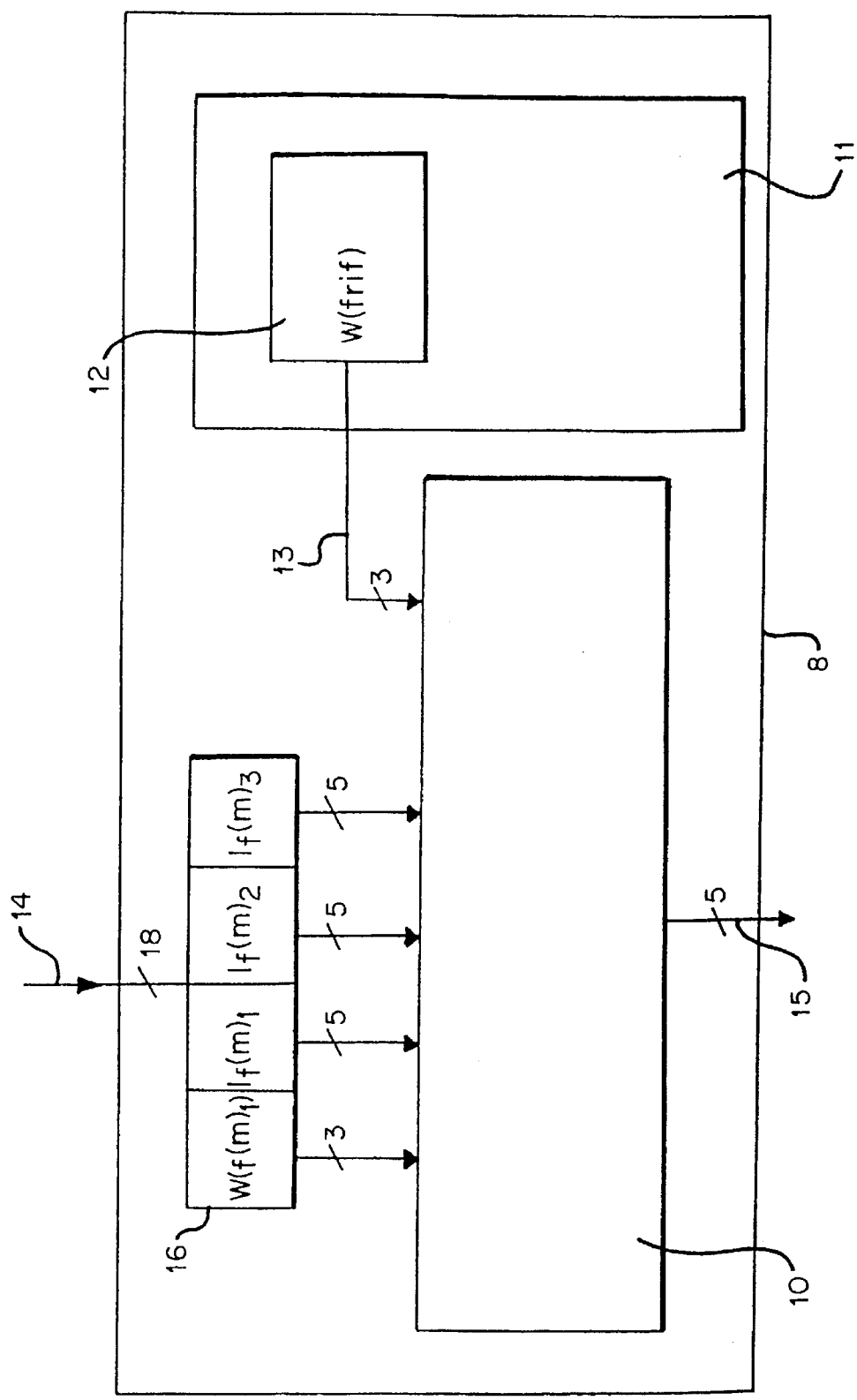
FIG. 5 is a diagrammatic view of a detail of the controller in FIG. 4.

This interfacing buffer section 8 is shown more in detail in FIG. 5, and mainly comprises a comparator 10 structured with a combinatory network, and a program memory section 11, also called "regenerative" for its function of regenerating or restoring of the effective values of the membership functions f(m). This program memory section 11 contains all the fuzzy rules required for the inference operations.

The program memory section 11 contains a micro-encoder 12 which selects, within the program memory section 11, the previously described reference words $w(f_{rij})$. Preferably, the program memory section 11 contains the index i of the membership functions $f(m)_i$ as the reference words $w(f_{rij})$. The program memory section 11 is addressed by a counter (not shown) driven by a data collection block (not shown) to sequentially generate addresses to the program memory section 11. The microencoder 12 controls the output of the program memory section 11 to provide the reference words $w(f_{rij})$. The output bus 13 of the micro-encoder 12 is connected to the comparator 10 input to provide $w(f_{rij})$.

The word from the memory section 5, as schematically shown at 16, is in turn presented to the input of the comparator 10, wherein the above restoring step is carried out. The extracted value or weight outgoing from the comparator 10 is then conveyed to the calculating section 6. The interconnection of the memory section 5 and the comparator 10 is provided by an eighteen wire bus 14, and the interconnection of the comparator 10 and the calculating section 6 is provided by the five wire bus 15.

Figure 6:
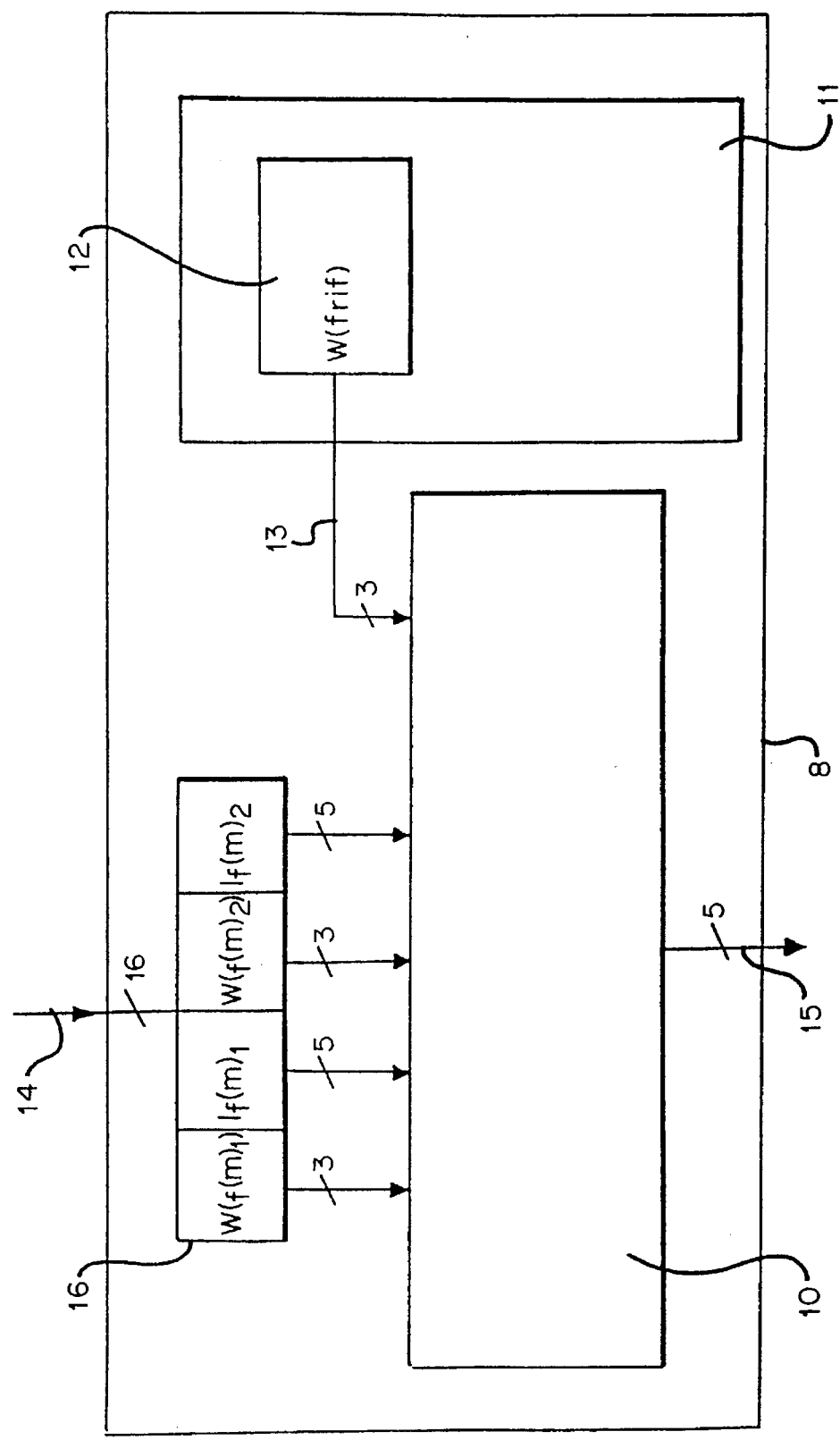
FIG. 6 is a diagrammatic of a modified embodiment of the detail shown in FIG. 5.

Shown in FIG. 6 is an alternative embodiment of the interfacing buffer section 8 illustrated in FIG. 5, which only differs from the latter by the memory word 16 coming from the section 5.

In this second embodiment of the invention, the interconnection of the memory section 5 and the comparator 10 is provided by a sixteen wire bus 14, since the size of the memory word is of sixteen bits only. This further reduction in length of the word is made possible because fuzzy logic information is stored into the memory section 5 in a slightly different manner compared to the way in which information is stored in the first embodiment described above.

The information which is written sequentially into each line of the memory section 5 advantageously comprises the membership functions $f(m)_i$ with non-null value l, except one, together with their corresponding values l of the degree of truth G.

As a result, at the point m=64 of the universe U of discourse in FIG. 1, for example, the word of the IF memory 6 will contain the following binary coded information: $f(64)_3$, 9/ $f(54)_4$, 23.

The length of the IF memory word is arranged to depend on the number of the non-zero values at the point in the universe of discourse where this number is largest, except one. Advantageously, the length of an IF memory section 5 word is defined as follows:

word length=(nf(m)–1)*(dim(G)+dim(f(m))), where nf(m)–1 is the number of non-null values at the point in the universe of discourse where this number is largest, except one.

(For the definition of dim(G) and dim(f(m)), reference is made to the corresponding part of this description covering the first embodiment of the invention.)

In the example of FIG. 1, the coefficient nf(m)–1 is two, whereby a memory word length of 2*(5+3)=16 bits is obtained, instead of the forty bits of the prior art and the eighteen bits of the first embodiment of the invention. The memory size will, therefore, be of 128*16 bits.

In a similar way as the previously described embodiment, the word outgoing from the memory section 5 is regenerated in a so-called restoring step of the effective values of the membership functions f(m), to extract the weights involved in the inference rules which control the fuzzy logic computation.

In accordance with this embodiment, the weights extraction is carried out during the restoring step by a comparison of the bits of a reference word $w(f_{rij})$ contained in the program memory 11—wherein all the fuzzy rules required for the inference operations are stored—with the bits of a part w(f(m)i of the word output from the memory section 5 concerning the membership functions $f(m)_i$.

Stated in a logic/mathematic language, the rule which controls the restoring step may be written as follows:

if $w(f_{rij})=w(f(m)_i)$ ==>weight=value $l_{f(m)i}$ if $w(f_{rij})=w(f(m)_i)$ weight=0
==> where: weight means the value which has been selected during the restoring step, and $l_{f(m)i}$ is the value (l) of the degree of truth (G) of the i-th membership function (f(m)).

A possible disadvantage of this second embodiment compared to the first resides in that the extraction of the weights involved in the computation operations using inference rules is slightly less accurate.

In fact, the information concerning the membership function with a value l other than zero which is not coded, can no longer be recovered during the next restoring step, and is definitively lost.

Obviously, this particular embodiment of the method for loading the memory according to the invention cannot be applied to the (very few) cases of Term sets having a coefficient nf(m) of 1.

A further, and more preferred, embodiment of the method for loading the memory according to the present invention, will now be described with reference to FIGS. 4, 5 and 6.

A command accessible by the user is connected inside the electronic control device 1 shown in FIG. 4, also called configuration flag, not shown because it is conventional, which enables the user to operate the first or second of the embodiments described above. In this way, and without having to act on the structure of the IF memory section 5, the operation flexibility of the control device can be improved, optimizing the use of the memory space.

According to this embodiment, the size of the memory 5 is not modified, but the meaning of the data encoded therein is changed.

In other words, if upon examining the Term set to be controlled, it appears more suitable to memorize a single membership function $f(m)_i$, together with the values l of the membership functions with non-null value, the information which will be written into each line of the memory 5 will be that defined according to the first embodiment.

If, on the other hand, it is preferable to code for each non-null value l, except one, the corresponding membership function $f(m)_i$, then the information which will be written into each line of the memory 5 will be that defined according to the second embodiment.

As previously outlined, the IF memory section 5 is advantageously sized according To the number of non-null values at the point in the universe of discourse where this number is the largest (nf(m)). To realize this embodiment, the size of the IF memory section 5 must have a word length capable of containing the information concerning the membership function, as described in connection with the two previous embodiments.

Therefore, if nf(m) is three or less, the word length of the memory 5 will be the word length defined in the first embodiment. On the contrary, if nf(m) is greater than three, the word length of the memory 5 will correspond to the definition given in the second embodiment.

Since in most cases the coefficient nf(m) is three, the optimum size of the memory 5 will have a word length of eighteen bits.

Moreover, It was found that this memory loading method meets the requirements of very many fuzzy logic applications.

In this respect, it is important to note that the word length of the memory section 5, as defined in the first two embodiments above cited, is only slightly affected by the number of the membership variables, which is a parameter that usually varies between Term sets, but is heavily dependent on the coefficient nf(m), the latter being a constant parameter for most Term sets, as pointed out above.

Thus, a memory sized to suit said maximum number of non-null values (nf(m)) will be most likely suitable in a wide range of fuzzy logic applications.

Of the principal advantages afforded by the present method and its implementing device is that it is possible to drastically cut down the required memory capacity for hardware implementing the membership functions, while operating at a high computation rate and a high degree of resolution, and without imposing restrictions on the forms of the membership functions.

Having now described a few embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A method for loading information into a memory of an electronic controller which performs fuzzy inference operations according to rules, wherein each rule comprises at least one preposition and at least one implication, wherein the rules use a number of membership functions are defined for a finite number of points within a universe of discourse, the method comprising the steps of:

generating values of the membership functions appearing in the preposition of at least one of the rules, wherein each value is indicative of a predetermined degree of membership, storing in the memory section, for each of the finite number of points, the values of only those membership functions for the point which are not zero, wherein a length of a word of the memory section is dependent on the number of non-zero values, and wherein the length of the memory word is equal to (nf(m)−1)*(dim(G)+dim(f(m))), where nf(m) is a number of non-null values at the point of the universe of discourse where the number is largest, dim(G) is a word size required to represent an aggregate of the values of the degree of membership, and dim(f(m)) is a word size required to represent the number of the membership functions.

2. A method according to claim 1, wherein information contained in the word when output from the memory section comprises, sequentially for each point in the universe of discourse, the membership functions (f(m)) with a non-zero value, associated with the corresponding value of the degree of membership.

3. A method according to claim 2, further comprising a step of regenerating the word output from the memory section by restoring the effective values of the membership functions, to extract predetermined weights involved in the inference rules, and wherein extraction of the predetermined weights includes the step of comparing bits of a reference word ($w(f_{rij})$) contained in a program memory, wherein the rules for the inference operations are stored, with bits of a part ($w(f(m)_i)$) of the word output from the memory section concerning the membership functions $(f(m)_i)$8.

4. A method according to claim 3, wherein the step of comparing the bits of the part ($w(f(m)_i)$) of word output from the memory section with the bits of the reference word ($w(f_{rij})$) coming from said program memory obeys the following logic relationship:

if $w(f_{rij})=w(f(m)_i)$ then weight=value $l_{f(m)i}$, and if $w(f_{rij})=w(f(m)_i)$ then weight=0 wherein weight means the value selected during the restoring step, and $l_{f(m)i}$ is the value of the degree of truth of the i-th membership function.

5. A method according to claim 4, wherein the information which is encoded within said memory section is of the type as defined in claim 2, according to language variables to be controlled.

6. A method according to claim 1, wherein the largest number of values of the membership functions stored in the memory section is determined according to the number of non-zero values of those membership functions which have at a predetermined point of the universe of discourse the largest number of non-zero values.

7. A method for loading information into a memory of an electronic controller which performs fuzzy inference operations according to rules, wherein each rule comprises at least one preposition and at least one implication, wherein the rules use a number of membership functions are defined for a finite number of points within a universe of discourse, the method comprising the steps of:

generating values of the membership functions appearing in the preposition of at least one of the rules, wherein each value is indicative of a predetermined degree of membership, storing in the memory section, for each of the finite number of points, the values of only those membership functions for the point which are not zero, wherein a length of a word of the memory section is dependent on the number of non-zero values, wherein the length of the memory word is equal to (nf(m)*(dim(G))+dim(f(m)) where, nf(m) is a number of non-zero values at the point of the universe of discourse where the number is largest, dim(G) is a word size required to represent an aggregate of the values of the degree of membership, and dim(f(m)) is a word size required to represent the number of the membership functions, and wherein information contained in the word when output from the memory section comprises, sequentially for each point of the universe of discourse, a i-th membership function $(f(m)_{i^o})$ having, among the membership functions with a non-zero value, the lowest index ($i^o$), together with the values of the degree of truth of the membership functions $(f(m)_i)$ with non-zero value.

8. A method according to claim 7, further comprising a step of regenerating the word output from the memory section by restoring the effective values of the membership functions (f(m)), to extract predetermined weights involved in the inference rules, and wherein extraction of the predetermined weights includes step of comparing bits of a reference word $(w(f_{rif}))$ contained in a program memory, wherein the rules for the inference operations are stored, with bits of a word $(w(f(m)_i))$ comprising the information concerning a membership function $(f(m)_i)$ with a non-zero value.

9. A method according to claim 8, wherein the word $(w(f(m)_i))$ comprising the information about a membership function $(f(m)_i)$ with a non-zero value, corresponds to a part of the word output from the memory section concerning the i-th membership function $(f(m)_{i^o})$ which has, of the membership functions with a non-zero value, the lowest index ($i^o$), or corresponds to a word concerning a membership function $(f(m)_i)$ with a non-zero value having an index adjacent to the lowest index.

10. A method according to claim 9, wherein the step of comparing the bits of the word $(w(f(m)_i))$, comprising the information concerning a membership function (f(m)i) with a non-zero value, with the bits of said reference word $(w(f_{rif}))$ coming from the program memory obeys the following logic relationship:

if $w(f_{rif})=w(f(m)_{i^o}, \ldots, i^o+nf(m)-1)$ then weight=value $l_{f(m)i^o, \ldots, i^o+(nf)(m)-1};$ and if $w(f_{rif})=w(f(m)_{i^o}, \ldots, i^o+nf(m)-1})$ then weight=0.

wherein weight means a value selected during the step of regenerating and, $l_{f(m)i^o, \ldots, i^o+(nf(m)-1)}$ is the value of the degree of truth of the $i^o, \ldots, i^o+(nf(m)-1)$-th membership function, and nf(m) is a number of non-zero values at the point of the universe of discourse where the number is the largest.

11. A method according to any one of claims 7 to 4, wherein the information which is encoded within the memory section is of the type as defined in claim 7, depending on language variables to be controlled.

12. A method according to claim 2, wherein the number of non-zero values is three.

13. An electronic control device which performs fuzzy inference operations according to rules, wherein each rule comprises at least one preposition and at least one implication, wherein the rules use a number of membership functions are defined for a finite number of points within a universe of discourse, the electronic control device including a central control unit having a memory section for storing predetermined values of the membership functions appearing in the preposition of at least one of the rules, wherein each value is indicative of a predetermined degree of membership, wherein the memory section has a capacity defined by a number of non-zero values of the membership functions at the point of the universe of discourse with a largest number of non-zero values.

wherein a length of a word of the memory section is dependent on the largest number of non-zero values, and wherein the length of the memory word is equal to (nf (m)−1)*(dim(G)+dim(f(m))), where nf(m) is a number of non-null values at the point of the universe of discourse where the number is largest, dim(G) is a word size required to represent an aggregate of the values of the degree of membership, and dim (f(m)) is a word size required to represent the number of the membership functions.

14. A device according to claim 13, further comprising:

a calculating section for performing the inference operations, and a buffer section, between the memory section and the calculating section, for regenerating the effective values of the membership functions to extract predetermined weights involved in the inference rules.

15. An electronic control device according to claim 14, wherein the buffer section comprises a program memory, wherein the rules for the inference operations are stored, connected to an output of a comparator for comparison of bits of a word $(w(f(m)_i))$ comprising the information about a membership function $(f(m)_i)$ having a non-zero value, with the bits of a reference word $(w(f_{rif}))$ contained in the program memory.

16. An electronic control device according to claim 15, further comprising a micro-encoder for connecting the comparator to the program memory and for selecting the reference words $(w(f_{rif}))$ within the program memory.

17. An electronic control device according to claim 16, wherein the comparator has inputs connected to respective outputs of the memory section and of the program memory, and is connected to the output of the calculating section.

18. An electronic control device according to claim 17, wherein a word of the memory section sequentially contains the information concerning the membership functions (f(m)) with non-zero value, but one, together with the corresponding values of the degree of membership.

19. An electronic control device which performs fuzzy inference operations according to rules, wherein each rule comprises at least one preposition and at least one implication, wherein the rules use a number of membership functions are defined for a finite number of points within a universe of discourse, the electronic control device including a central control unit having a memory section for storing predetermined values of the membership functions appearing in the preposition of at least one of the rules, wherein each value is indicative of a predetermined degree of membership, wherein the memory section has a capacity fefined by a number of non-zero values of the membership functions at the point of the universe of discourse with a largest number of non-zero values, wherein a length of a word of the memory section is dependent on the number of non-zero values, wherein the length of the memory word is equal to $(nf(m)*(dim(G))+dim(f(m)))$ where, $nf(m)$ is a number of non-zero values at the point of the universe of discourse where the number is largest, $dim(G)$ is a word size required to represent an aggregate of the values of the degree of membership, and $dim(f(m))$ is a word size required to represent the number of the membership functions, and wherein information contained in the word when output from the memory section comprises, sequentially for each point of the universe of discourse, an i-th membership function $(f(m)_{i_o})$ having, among the membership functions with a non-zero value, the lowest index (io), together with the values of the degree of truth of the membership functions $(f(m)_i)$ with non-zero value.

20. An electronic control device according to claim 19, further comprising a command, accessible by a user, for encoding within said memory section of the information concerning language variables, depending on language variables to be controlled.

21. An electronic control device according to claim 18, further comprising a command, accessible by a user, for encoding within said memory section of the information concerning language variables, depending on the language variables to be controlled.

* * * * *

UNITED STATES PATENT AND TRADEMARK OFFICE
CERTIFICATE OF CORRECTION

PATENT NO.   : 5,621,860  
DATED        : April 15, 1997  
INVENTOR(S)  : Biagio Russo, Claudio Luzzi, and Rinaldo Poluzzi It is certified that error appears in the above-identified patent and that said Letters Patent is hereby corrected as shown below:

Column 10,  
Lines 39-42, should read as follows:  
-- if $w(f_{rif}) = w(f(m)_i) = \Longrightarrow$ weight =value $l_{f(m)i}$  
   if $w(f_{rif}) \neq w(f(m)_i) = \Longrightarrow$ weight =0 --

Column 12,  
Line 34, should read as follows:  
-- concerning the membership functions $(f(m)_i)$. --  
Line 36, should read as follows:  
-- comparing the bits of the part $(w(f(m)_i))$ of the word output from --  
Line 43, should read as follows:  
-- if $w(f_{rif}) \neq w(f(m)_i)$ then weight = 0 --

Column 13,  
Line 54, should read as follows:  
-- if $w(f_{rif}) \neq w(f(m)_{i^\circ}, \ldots, i^\circ + (nf(m)-1))$ then weight = 0 --

Column 13, claim 10,  
Line 54, after "+", please insert -- ( --.

Column 13, claim 11,  
Line 62, please change "4" to -- 10 --.

Signed and Sealed this

First Day of January, 2002

JAMES E. ROGAN  
*Director of the United States Patent and Trademark Office*

*Attest:*

*Attesting Officer*